(12) United States Patent
Kitawaki et al.

(10) Patent No.: US 11,037,594 B2
(45) Date of Patent: Jun. 15, 2021

(54) ALUMINUM-ALLOY SUBSTRATE FOR MAGNETIC DISK, METHOD FOR MANUFACTURING SAME AND MAGNETIC DISK EMPLOYING SAID ALUMINUM-ALLOY SUBSTRATE FOR MAGNETIC DISK

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Makoto Yonemitsu, Tokyo (JP); Hideyuki Hatakeyama, Tokyo (JP); Takashi Nakayama, Tokyo (JP); Yasuo Fujii, Tokyo (JP); Ryo Sakamoto, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/969,847

(22) PCT Filed: Feb. 6, 2019

(86) PCT No.: PCT/JP2019/004294
§ 371 (c)(1),
(2) Date: Aug. 13, 2020

(87) PCT Pub. No.: WO2019/159795
PCT Pub. Date: Aug. 22, 2019

(65) Prior Publication Data
US 2020/0381015 A1     Dec. 3, 2020

(30) Foreign Application Priority Data

Feb. 17, 2018   (JP) .............................. JP2018-026537

(51) Int. Cl.
*G11B 5/858* (2006.01)
*G11B 5/73* (2006.01)
(Continued)

(52) U.S. Cl.
CPC ................. *G11B 5/858* (2013.01); *B21B 3/00* (2013.01); *C22C 21/00* (2013.01); *C22F 1/04* (2013.01);
(Continued)

(58) Field of Classification Search
CPC ......... C22C 21/02; C22C 21/00; G11B 5/858; G11B 5/73919; B21B 2003/001; C22F 1/04; C23C 18/1637
See application file for complete search history.

(56) References Cited

U.S. PATENT DOCUMENTS

| | | |
|---|---|---|
| 2002/0149876 A1 | 10/2002 | Sakata et al. |
| 2017/0327930 A1 | 11/2017 | Kitawaki et al. |
| 2018/0221928 A1 | 8/2018 | Kitawaki et al. |

FOREIGN PATENT DOCUMENTS

| | | |
|---|---|---|
| JP | 10102177 A | 4/1998 |
| JP | 2002313061 A | 10/2002 |

(Continued)

OTHER PUBLICATIONS

Written Opinion of the ISR, dated Mar. 12, 2019 (with machine translation).
(Continued)

*Primary Examiner* — George Wyszomierski
*Assistant Examiner* — Janell C Morillo
(74) *Attorney, Agent, or Firm* — Greer Burns & Crain Ltd.

(57) ABSTRACT

Provided is an aluminum alloy substrate for a magnetic disk that includes an aluminum alloy containing 0.4 to 3.0 mass % (hereinafter abbreviated as "%") of Fe, 0.005% to 1.000%
(Continued)

of Cu, and 0.005% to 1.000% of Zn, with a balance of Al and unavoidable impurities. This substrate has a ratio A/B of 0.70 or more, where A indicates a distribution density of Al—Fe intermetallic compound particles having maximum diameters of 10 μm or more and less than 16 μm, and B indicates a distribution density of Al—Fe intermetallic compound particles having maximum diameters of 10 μm or more. The distribution density of Al—Fe intermetallic compound particles having maximum diameters of 40 μm or more is at most one per square millimeter. Also provided are a method of fabricating this aluminum alloy substrate for a magnetic disk and a magnetic disk composed of the aluminum alloy substrate for a magnetic disk.

7 Claims, 1 Drawing Sheet (51) Int. Cl.
*C22C 21/00* (2006.01)
*C22F 1/04* (2006.01)
*C23C 18/16* (2006.01)
*B21B 3/00* (2006.01)
*C23C 18/50* (2006.01)

(52) U.S. Cl.
CPC .......... *C23C 18/1637* (2013.01); *C23C 18/50* (2013.01); *G11B 5/73919* (2019.05); *B21B 2003/001* (2013.01)

(56) References Cited

FOREIGN PATENT DOCUMENTS

| | | |
|---|---|---|
| JP | 2013112884 A | 6/2013 |
| JP | 2017031507 A | 2/2017 |
| WO | 2016068293 A1 | 5/2016 |

OTHER PUBLICATIONS

ISR issued in Int'l. Application No. PCT/JP2019/004294, dated Mar. 12, 2019.

ALUMINUM-ALLOY SUBSTRATE FOR MAGNETIC DISK, METHOD FOR MANUFACTURING SAME AND MAGNETIC DISK EMPLOYING SAID ALUMINUM-ALLOY SUBSTRATE FOR MAGNETIC DISK

This is a National Phase Application filed under 35 U.S.C. § 371, of International Application No. PCT/JP2019/004294, filed Feb. 6, 2019, the contents of which are incorporated by reference.

TECHNICAL FIELD

The present disclosure relates to an aluminum alloy substrate for a magnetic disk having excellent plating characteristics and fluttering characteristics of the disk, a method of fabricating the aluminum alloy substrate for a magnetic disk, and a magnetic disk composed of the aluminum alloy substrate for a magnetic disk.

BACKGROUND ART

Magnetic disks applied to a storage device of a computer are made of substrates having excellent plating characteristics, mechanical characteristics, and processability. For example, some of the substrates are mainly composed of aluminum alloys in accordance with JIS5086 (that is, alloys containing 3.5 to 4.5 mass % of Mg, 0.50 mass % or less of Fe, 0.40 mass % or less of Si, 0.20 to 0.70 mass % of Mn, 0.05 to 0.25 mass % of Cr, 0.10 mass % or less of Cu, 0.15 mass % or less of Ti, and 0.25 mass % or less of Zn, with a balance of Al and unavoidable impurities).

In general, a magnetic disk is fabricated by preparing an annular aluminum alloy substrate, plating the aluminum alloy substrate, and then applying a magnetic material onto the surface of the aluminum alloy substrate.

For example, an aluminum alloy magnetic disk composed of the JIS5086 alloy is fabricated as follows. An aluminum alloy material having a certain chemical composition is cast to produce an ingot. This ingot is hot rolled and then cold rolled into a rolled plate having a thickness required as a magnetic disk. This rolled plate is preferably annealed, for example, during the cold rolling as required. The rolled plate is then punched to yield an annular plate, and is provided with an annular aluminum alloy plate thereon to remove distortion or the like caused by the fabrication process. This annular plate is annealed and flattened while being pressurized on both surfaces of both ends in a pressure annealing process. These processes yield an annular aluminum alloy substrate.

The resulting annular aluminum alloy substrate is subject to pretreatment involving a cutting process, grinding process, degreasing process, etching process, and zincate treatments (Zn substitution). The substrate is then subject to electroless base plating of Ni—P, which is a hard non-magnetic metal. The electroless Ni—P plated surface is polished and provided with a magnetic material by spattering. These processes produce an aluminum alloy magnetic disk.

In recent years, magnetic disks have been required to have higher capacities, higher densities, and higher speeds due to need for multimedia, for example. Since the number of magnetic disks installed in a storage device increases for expanding the capacity, each of the magnetic disks should accordingly have a smaller thickness.

Unfortunately, a disk having a smaller thickness and a higher speed has a lower rigidity and receives an increased exciting force due to an increase in fluid force caused by rapid rotation, and thus often causes disk flutters. That is, the magnetic disk vibrates (flutters) due to unstable airflows generated between rapidly rotating magnetic disks. This phenomenon seems to occur because the head cannot follow large vibration of the magnetic disks composed of substrates having low rigidity. Such disk flutters increase the frequency of errors in positioning of the head, which is a reading unit, and therefore should be reduced.

In addition, in a magnetic disk having a higher density, the size of a magnetic area per one bit is further reduced. Such a reduction in size increases the frequency of reading errors caused by erroneous deviations in positioning of the head. Strongly desired is a reduction in disk flutters, which is the main cause of an error in positioning of the head.

Since the size of a magnetic area per one bit is further reduced in a magnetic disk having a higher density, even a fine pit (hole) on the plated surface of the magnetic disk may cause an error in data reading. The plated surface of the magnetic disk is therefore required to include a few pits and have high smoothness.

In view of these circumstances, recent demands and studies have been focused on aluminum alloy substrates for magnetic disks having excellent plating characteristics and causing few disk flutters. For example, an airflow reducing component has been proposed that is installed inside a hard disk drive and has a plate facing a disk. Patent Literature 1 discloses a magnetic disk drive equipped with an air spoiler upstream of an actuator. This air spoiler reduces an air flow on a magnetic disk toward the actuator and thus suppresses turbulent vibration of a magnetic head. The air spoiler also prevents disk flutters by reducing an air flow on the magnetic disk. Furthermore, Patent Literature 2 discloses a method of improving the rigidity of an aluminum alloy plate by adding a large amount of Si to the plate, which contributes to an improvement in rigidity.

Unfortunately, in the method disclosed in Patent Literature 1, the effects of preventing disk flutters vary depending on the size of the gap between the substrate for a magnetic disk and the installed air spoiler. The method thus requires high accuracy of components, leading to an increase in costs of the components.

The method of adding a large amount of Si as disclosed in Patent Literature 2 can effectively improve the rigidity but fails to achieve target excellent plating characteristics.

CITATION LIST

Patent Literature

Patent Literature 1: Unexamined Japanese Patent Application Publication No. 2002-313061
Patent Literature 2: International Publication No. WO 2016/068293

SUMMARY OF INVENTION

Technical Problem

An objective of the disclosure, which has been accomplished in view of the above situation, is to provide an aluminum alloy substrate for a magnetic disk having excellent plating characteristics and fluttering characteristics of the disk, a method of fabricating the aluminum alloy substrate for a magnetic disk, and a magnetic disk composed of the aluminum alloy substrate for a magnetic disk.

Solution to Problem

That is, according to a first aspect of the disclosure, an aluminum alloy substrate for a magnetic disk includes an aluminum alloy containing 0.4 to 3.0 mass % of Fe, 0.005 to 1.000 mass % of Cu, and 0.005 to 1.000 mass % of Zn, with a balance of Al and unavoidable impurities. The substrate has a ratio AB of 0.70 or more, where A indicates a distribution density of Al—Fe intermetallic compound particles having maximum diameters of 10 μm or more and less than 16 μm, and B indicates a distribution density of Al—Fe intermetallic compound particles having maximum diameters of 10 μm or more. The distribution density of Al—Fe intermetallic compound particles having maximum diameters of 40 μm or more is at most one per square millimeter.

According to a second aspect of the disclosure, the aluminum alloy may further contain one or more elements selected from a group comprising 0.1 to 3.0 mass % of Mn, 0.1 to 0.4 mass % of Si, 0.1 to 0.4 mass % of Mg, 0.1 to 3.0 mass % of Ni, 0.01 to 1.00 mass % of Cr, and 0.01 to 1.00 mass % of Zr in the substrate according to the first aspect.

According to a third aspect of the disclosure, the aluminum alloy may further contain one or more elements selected from a group comprising Ti, B, and V at a total content of 0.005 to 0.500 mass % in the substrate according to the first or second aspect.

According to a fourth aspect of the disclosure, a magnetic disk is composed of the aluminum alloy substrate for a magnetic disk according to any one of the first to third aspects, an electroless Ni—P plated layer on a surface of the aluminum alloy substrate, and a magnetic material layer on the plated layer.

According to a fifth aspect of the disclosure, a method of fabricating the aluminum alloy substrate for a magnetic disk according to any one of the first to third aspects, includes a casting step of casting the aluminum alloy to produce an ingot, a cold rolling step of cold rolling the ingot to produce a plate, a disk blank punching step of punching the cold rolled plate to produce a disk blank having an annular shape, a pressure annealing step of pressure annealing the disk blank, and a cutting and grinding step of cutting and grinding the pressure annealed disk blank. The cold rolling step is conducted in a temperature range of 60° C. to 180° C. such that a reduction ratio in each path is 15% or more and a total reduction ratio is 50% or more.

According to a sixth aspect of the disclosure, the method according to the fifth aspect may further include a homogenization heating step of heating the ingot at a temperature of 280° C. to 620° C. for 0.5 to 60 hours to homogenize the ingot, which is conducted after the casting step and before the cold rolling step, and a hot rolling step of hot rolling the homogenized ingot to produce a plate at a start temperature of 250° C. to 600° C. and an end temperature of 230° C. to 450° C.

According to a seventh aspect of the disclosure, the method according to the fifth or sixth aspect may further include an annealing step of annealing the ingot or the rolled plate before or during the cold rolling step, which is conducted in a batch manner at a temperature of 300° C. to 500° C. for 0.1 to 30 hours, or in a continuous manner at a temperature of 400° C. to 600° C. for 0 to 60 seconds.

Advantageous Effects of Invention

The disclosure can provide an aluminum alloy substrate for a magnetic disk having excellent plating characteristics and fluttering characteristics of the disk, a method of fabricating the aluminum alloy substrate for a magnetic disk, and a magnetic disk composed of the aluminum alloy substrate for a magnetic disk.

DESCRIPTION OF EMBODIMENTS

The present inventors have focused on the relationship between the plating characteristics or fluttering characteristics of a substrate and materials thereof and carried out intensive studies on the relationship between the characteristics and the properties of the substrate (that constitutes a magnetic disk). As a result, the inventors have found that the plating characteristics and fluttering characteristics are significantly affected by the Fe, Cu, and Zn contents of the substrate and the size distributions of Al—Fe intermetallic compound particles. The inventors have thus found that a particular aluminum alloy substrate for a magnetic disk has improved plating characteristics and fluttering characteristics. This substrate has an Fe content of 0.4 to 3.0 mass % (hereinafter abbreviated as "%"), a Cu content of 0.005% to 1.000%, and a Zn content of 0.005% to 1.000%. The substrate has a ratio AB of 0.70 or more, where A indicates a distribution density of Al—Fe intermetallic compound particles having maximum diameters of 10 μm or more and less than 16 μm, and B indicates a distribution density of Al—Fe intermetallic compound particles having maximum diameters of 10 μm or more, and a distribution density of Al—Fe intermetallic compound particles having maximum diameters of 40 μm or more is at most one per square millimeter. On the basis of these findings, the inventors have completed the disclosure.

A. Aluminum Alloy Substrate for a Magnetic Disk

An aluminum alloy substrate for a magnetic disk according to the disclosure (hereinafter abbreviated as "aluminum alloy substrate according to the disclosure" or simply as "aluminum alloy substrate") will now be described in detail.

1. Alloy Composition

The following description will be focused on the constituent elements of the Al—Fe aluminum alloy contained in an aluminum alloy substrate for a magnetic disk according to the disclosure, and on the contents of these elements.

Fe:

Fe is an essential element and exists mainly in the form of second phase particles (for example, Al—Fe intermetallic compound particles) and partly in the form of a solid solution in the matrix. Fe has effects of improving the strength and fluttering characteristics of the aluminum alloy substrate. The excellent fluttering characteristics are provided because a viscous flow at the interface between the second phase particles and the matrix rapidly absorbs the vibration energy in response to application of vibration to such a material. The Fe content of the aluminum alloy of less than 0.4% cannot achieve sufficient strength or fluttering characteristics. In contrast, the Fe content exceeding 3.0% results in generation of a large number of coarse Al—Fe intermetallic compound particles. These coarse Al—Fe intermetallic compound particles fall off during an etching process, zincate treatments, cutting process, or grinding process to yield large recesses. The plating pits impair the smoothness of the plated surface and cause peeling of the surface. This phenomenon also reduces the processability during a rolling process. For these reasons, the Fe content of the aluminum alloy is adjusted to the range of 0.4% to 3.0%. The Fe content is preferably in the range of 0.6% to 2.0%, and more preferably in the range of 0.8% to 1.8%.

Cu:

Cu is an essential element and reduces the amount of dissolved Al during zincate treatments. Cu has effects of applying a zincate coating in a uniform, thin, and dense manner to improve the smoothness and adhesion during the subsequent plating process. The Cu content of the aluminum alloy of less than 0.005% makes the zincate coating nonuniform, which causes pits on the plated surface and thus impairs the smoothness of the plated surface. In contrast, the Cu content of the aluminum alloy exceeding 1.000% results in generation of a large number of coarse Al—Cu intermetallic compound particles. These coarse Al—Cu intermetallic compound particles fall off during an etching process, zincate treatments, cutting process, or grinding process to yield large recesses. The pits on the plated surface impair the smoothness of the plated surface and facilitate peeling of the surface. For these reasons, the Cu content of the aluminum alloy is adjusted to the range of 0.005% to 1.000%. The Cu content is preferably in the range of 0.005% to 0.400%.

Zn:

Zn is an essential element and reduces the amount of dissolved Al during zincate treatments. Zn has effects of applying a zincate coating in a uniform, thin, and dense manner to improve the smoothness and adhesion during the subsequent plating process. The Zn content of the aluminum alloy of less than 0.005% makes the zincate coating nonuniform, which causes pits on the plated surface and thus impairs the smoothness of the plated surface. In contrast, the Zn content of the aluminum alloy exceeding 1.000% makes the zincate coating nonuniform, which causes pits on the plated surface and thus impairs the smoothness of the plated surface. These contents also readily cause peeling of the surface. For these reasons, the Zn content of the aluminum alloy is adjusted to the range of 0.005% to 1.000%. The Zn content is preferably in the range of 0.100% to 0.700%.

In order to further improve the plating characteristics and fluttering characteristics of the aluminum alloy substrate for a magnetic disk, the substrate may further contain one or more first optional elements selected from a group comprising 0.1% to 3.0% of Mn, 0.1% to 0.4% of Si, 0.1% to 0.4% of Mg, 0.1% to 3.0% of Ni, 0.01% to 1.00% of Cr, and 0.01% to 1.00% of Zr. The substrate may further contain one or more second optional elements selected from a group comprising Ti, B, and V at a total content of 0.005% to 0.500%. These optional elements will now be described.

Mn:

Mn exists mainly in the form of second phase particles (for example, Al—Mn intermetallic compound particles). Mn has effects of improving the strength and fluttering characteristics of the aluminum alloy substrate. The excellent fluttering characteristics are provided because a viscous flow at the interface between the second phase particles and the matrix rapidly absorbs the vibration energy in response to application of vibration to such a material. The Mn content of the aluminum alloy of 0.1% or more can further enhance the effects of improving the strength and fluttering characteristics of the aluminum alloy substrate. The Mn content of the aluminum alloy of 3.0% or less can suppress generation of a large number of coarse Al—Mn intermetallic compound particles. This feature can prevent the coarse Al—Mn intermetallic compound particles from falling off during an etching process, zincate treatments, cutting process, or grinding process to yield large recesses, thereby further suppressing impairment of the smoothness of the plated surface and peeling of the surface. This feature can also further suppress a reduction in processability during a rolling process. For these reasons, the Mn content of the aluminum alloy is preferably in the range of 0.1% to 3.0%, and more preferably in the range of 0.1% to 1.0%.

Si:

Si exists mainly in the form of second phase particles (for example, Si particles or Mg—Si intermetallic compound particles). Si has effects of improving the strength and fluttering characteristics of the aluminum alloy substrate. The excellent fluttering characteristics are provided because a viscous flow at the interface between the second phase particles and the matrix rapidly absorbs the vibration energy in response to application of vibration to such a material. The Si content of the aluminum alloy of 0.1% or more can further enhance the effects of improving the strength and fluttering characteristics of the aluminum alloy substrate. The Si content of the aluminum alloy of 0.4% or less can suppress generation of a large number of coarse second phase particles. This feature can prevent the coarse second phase particles from falling off during an etching process, zincate treatments, cutting process, or grinding process to yield large recesses, thereby further suppressing impairment of the smoothness of the plated surface and peeling of the surface. This feature can also further suppress a reduction in processability during a rolling process. For these reasons, the Si content of the aluminum alloy is preferably in the range of 0.1% to 0.4%, and more preferably in the range of 0.1% to 0.3%.

Mg:

Mg exists in the form of a solid solution in the matrix or in the form of second phase particles (for example, Mg—Si intermetallic compound particles). Mg has effects of improving the strength and fluttering characteristics of the aluminum alloy substrate. The Mg content of the aluminum alloy of 0.1% or more can further enhance the effects of improving the strength and fluttering characteristics of the aluminum alloy substrate. The Mg content of the aluminum alloy of 0.4% or less can suppress generation of a large number of coarse second phase particles. This feature can prevent the coarse second phase particles from falling off during an etching process, zincate treatments, cutting process, or grinding process to yield large recesses, thereby further suppressing impairment of the smoothness of the plated surface and peeling of the surface. This feature can also further suppress a reduction in processability during a rolling process. For these reasons, the Mg content of the aluminum alloy is preferably in the range of 0.1% to 0.4%, and more preferably in the range of 0.1% or more and 0.3% or less.

Ni:

Ni exists mainly in the form of second phase particles (for example, Al—Ni intermetallic compound particles). Ni has effects of improving the strength and fluttering characteristics of the aluminum alloy substrate. The excellent fluttering characteristics are provided because a viscous flow at the interface between the second phase particles and the matrix rapidly absorbs the vibration energy in response to application of vibration to such a material. The Ni content of the aluminum alloy of 0.1% or more can further enhance the effects of improving the strength and fluttering characteristics of the aluminum alloy substrate. The Ni content of the aluminum alloy of 3.0% or less can suppress generation of a large number of coarse Al—Ni intermetallic compound particles. This feature can prevent the coarse Al—Ni intermetallic compound particles from falling off during an etching process, zincate treatments, cutting process, or grinding process to yield large recesses, thereby further suppressing impairment of the smoothness of the plated surface and peeling of the surface. This feature can also further suppress a reduction in processability during a rolling process. For these reasons, the Ni content of the aluminum alloy is preferably in the range of 0.1% to 3.0%, and more preferably in the range of 0.1% to 1.0%.

Cr:

Cr exists mainly in the form of second phase particles (for example, Al—Cr intermetallic compound particles). Cr has effects of improving the strength and fluttering characteristics of the aluminum alloy substrate. The Cr content of the aluminum alloy of 0.01% or more can further enhance the effects of improving the strength and fluttering characteristics of the aluminum alloy substrate. The Cr content of the aluminum alloy of 1.00% or less can suppress generation of a large number of coarse Al—Cr intermetallic compound particles. This feature can prevent the coarse Al—Cr intermetallic compound particles from falling off during an etching process, zincate treatments, cutting process, or grinding process to yield large recesses, thereby further suppressing impairment of the smoothness of the plated surface and peeling of the surface. This feature can also further suppress a reduction in processability during a rolling process. For these reasons, the Cr content of the aluminum alloy is preferably in the range of 0.01% to 1.00%, and more preferably in the range of 0.10% to 0.50%.

Zr:

Zr exists mainly in the form of second phase particles (for example, Al—Zr intermetallic compound particles). Zr has effects of improving the strength and fluttering characteristics of the aluminum alloy substrate. The Zr content of the aluminum alloy of 0.01% or more can further enhance the effects of improving the strength and fluttering characteristics of the aluminum alloy substrate. The Zr content of the aluminum alloy of 1.00% or less can suppress generation of a large number of coarse Al—Zr intermetallic compound particles. This feature can prevent the coarse Al—Zr intermetallic compound particles from falling off during an etching process, zincate treatments, cutting process, or grinding process to yield large recesses, thereby further suppressing impairment of the smoothness of the plated surface and peeling of the surface. This feature can also further suppress a reduction in processability during a rolling process. For these reasons, the Zr content of the aluminum alloy is preferably in the range of 0.01% to 1.00%, and more preferably in the range of 0.10% to 0.50%.

Ti, B, V:

Ti, B, and V form second phase particles (for example, particles of boride, such as $TiB_2$, or $Al_3Ti$ or Ti-V-B) during a solidification process of casting, which serve as nuclei of crystal grains, and can thus produce finer crystal grains, leading to an improvement in plating characteristics. These finer crystal grains contribute to an increase in uniformity of the sizes of the second phase particles and a decrease in variation of the strength and fluttering characteristics in the aluminum alloy substrate. These effects, however, cannot be achieved by Ti, B, and V at a total content of less than 0.005%. In contrast, the effects are saturated and not significantly enhanced even if the total content of Ti, B, and V exceeds 0.500%. For these reasons, if Ti, B, or V is added, the total content of Ti, B, and V is preferably in the range of 0.005% to 0.500%, and more preferably in the range of 0.005% to 0.100%. It should be noted that the total amount indicates the amount of any one element of Ti, B, and V for the alloy containing only this element, the sum of the amounts of any two elements for the alloy containing these two elements, and the sum of the amounts of three elements for the alloy containing all the three elements.

Other Elements:

The rest of the aluminum alloy according to the disclosure is composed of Al and unavoidable impurities. Examples of the unavoidable impurities include Ga and Sn. If the content of each impurity is less than 0.10% and if the total content is less than 0.20%, the impurity do not impair the characteristics of the aluminum alloy substrate according to the disclosure.

2. Distribution of Intermetallic Compound Particles

A distribution of intermetallic compound particles in the aluminum alloy substrate for a magnetic disk according to the disclosure will now be described.

The aluminum alloy substrate for a magnetic disk according to the disclosure has a metal structure, in which a ratio AB is 0.70 or more, where A indicates a distribution density of Al—Fe intermetallic compound particles having maximum diameters of 10 μm or more and less than 16 μm, and B indicates a distribution density of Al—Fe intermetallic compound particles having maximum diameters of 10 μm or more, and a distribution density of Al—Fe intermetallic compound particles having maximum diameters of 40 μm or more is at most one per square millimeter.

The above-mentioned intermetallic compound particles indicate second phase particles of deposited or crystallized elements. Specific examples of Al—Fe intermetallic compound include $Al_3Fe$, $Al_6Fe$, $Al_6(Fe, Mn)$, Al—Fe—Si, Al—Fe—Mn—Si, Al—Fe—Ni, and Al—Cu—Fe. The aluminum alloy substrate according to the disclosure contains, as well as the above-mentioned Al—Fe intermetallic compound particles, other particles of intermetallic compounds, such as an Mg—Si intermetallic compound ($Mg_2Si$), Al—Mn intermetallic compounds ($Al_6Mn$ and Al—Mn—Si), Al—Ni intermetallic compounds (for example, $Al_3Ni$), Al—Cu intermetallic compounds (for example, $Al_2Cu$), Al—Cr intermetallic compounds (for example, $Al_7Cr$), and Al—Zr intermetallic compounds (for example, $Al_3Zr$). It should be noted that examples of second phase particles also include Si particles in addition to these intermetallic compound particles.

The aluminum alloy substrate for a magnetic disk according to the disclosure has a metal structure, in which a ratio A/B is 0.70 or more, where A indicates a distribution density (number per square millimeter) of Al—Fe intermetallic compound particles having maximum diameters of 10 μm or more and less than 16 μm, and B indicates a distribution density (number per square millimeter) of Al—Fe intermetallic compound particles having maximum diameters of 10 μm or more, and a distribution density of Al—Fe intermetallic compound particles having maximum diameters of 40 μm or more is at most one per square millimeter. The sizes and distributions (surface densities) of intermetallic compound particles are thus preliminarily defined, thereby reducing the number of pits on the plated surface and improving the smoothness of the plated surface.

During plating pretreatment processes, such as etching, cathode reactions are expected to occur on the Al—Fe intermetallic compound particles while anode reactions (dissolution of the Al matrix) are expected to occur around the Al—Fe intermetallic compound particles. In the case of a ratio A/B of less than 0.70 (that is, in the case of a higher ratio of coarse Al—Fe intermetallic compound particles having maximum diameters of 16 μm or more to the Al—Fe intermetallic compound particles having maximum diameters of 10 µm or more, or in the case of a lower ratio of Al—Fe intermetallic compound particles having maximum diameters of 10 µm or more and less than 16 µm), then the anode and cathode reactions are concentrated at the coarse intermetallic compound particles, thereby generating large recesses on the surface of the aluminum alloy substrate and thus yielding pits on the plated surface. In contrast, in the case of a ratio A/B of 0.70 or more (that is, in the case of a lower ratio of coarse Al—Fe intermetallic compound particles having maximum diameters of 16 µm or more to the Al—Fe intermetallic compound particles having maximum diameters of 10 µm or more, or in the case of a higher ratio of Al—Fe intermetallic compound particles having maximum diameters of 10 µm or more and less than 16 µm), then large recesses do not readily occur, resulting in a smaller number of pits on the plated surface. Furthermore, the Al—Fe intermetallic compound can also bring about effects of improving the fluttering characteristics.

If the ratio A/B is less than 0.70, where A indicates a distribution density of Al—Fe intermetallic compound particles having maximum diameters of 10 µm or more and less than 16 µm, and B indicates a distribution density of Al—Fe intermetallic compound particles having maximum diameters of 10 µm or more, then pits are generated on the plated surface, thereby impairing the smoothness of the plated surface. The ratio A/B is therefore defined to be 0.70 or more, where A indicates a distribution density of Al—Fe intermetallic compound particles having maximum diameters of 10 µm or more and less than 16 µm, and B indicates a distribution density of Al—Fe intermetallic compound particles having maximum diameters of 10 µm or more. The ratio A/B is preferably 0.8 or more, and more preferably 0.9 or more.

The specific range of the distribution density of Al—Fe intermetallic compound particles having maximum diameters of 10 µm or more and less than 16 µm is not particularly limited according to the disclosure, but is consequentially determined depending on the composition and fabrication method of the aluminum alloy plate. A typical example of distribution density is 10 to 3,000 per square millimeter based on the results of studies of the inventors. Also, the specific range of the distribution density of Al—Fe intermetallic compound particles having maximum diameters of 10 µm or more is not particularly limited, but is consequentially determined depending on the composition and fabrication method of the aluminum alloy plate. A typical example of distribution density is 10 to 5,000 per square millimeter based on the results of studies of the inventors.

The lower limit of maximum diameters of Al—Fe intermetallic compound particles existing in the metal structure of the aluminum alloy substrate is defined to be 10 µm, because of the difficulty of making the maximum diameters to be less than 10 µm. In the case of a maximum diameter of 16 µm or more, however, large recesses readily occur on the substrate surface. On the basis of these facts, the ratio of the distribution density (A) of Al—Fe intermetallic compound particles having maximum diameters of 10 µm or more and less than 16 µm to the distribution density (B) of all the Al—Fe intermetallic compound particles having maximum diameters of 10 µm or more is used as an index of suppression of generation of large recesses according to the disclosure.

Some of the Al—Fe intermetallic compound particles have maximum diameters of 40 µm or more. Such larger maximum diameters lead to ready generation of plating pits, thereby impairing the smoothness of the plated surface. According to the disclosure, the distribution density of Al—Fe intermetallic compound particles having maximum diameters of 40 µm or more is defined to be at most one per square millimeter. The distribution density of Al—Fe intermetallic compound particles having maximum diameters of 40 µm or more is preferably zero per square millimeter. Larger maximum diameters lead to ready generation of plating pits, and maximum diameters exceeding 50 µm may further impair the smoothness of the plated surface due to the plating pits. The generation of plating pits should be suppressed by eliminating Al—Fe intermetallic compound particles having maximum diameters exceeding 50 µm. According to the disclosure aimed at suppression of pit generation, the upper limit of maximum diameters is preferably 50 µm.

According to the disclosure, a maximum diameter is determined, in a flat image of an intermetallic compound particle observed with an optical microscope, by measuring the maximum distance between one point on the outline of the image and another point on the outline, and measuring such maximum distances for all the points on the outline, and then selecting the largest one of the maximum distances.

3. Fluttering Characteristics

The fluttering characteristics will now be described. The fluttering characteristics are also affected by the motor characteristics of a hard disk drive. According to the disclosure, the level of fluttering characteristics in the air is preferably 50 nm or less, and more preferably 30 nm or less. The level of fluttering characteristics of 50 nm or less is expected to be sufficient for use in a general HDD. The level of fluttering characteristics exceeding 50 nm increases the frequency of errors in positioning of the head, which is a reading unit.

In helium gas, the level of fluttering characteristics is preferably 30 nm or less, and more preferably 20 nm or less. The level of fluttering characteristics of 30 nm or less is expected to be sufficient for use in a general HDD. The level of fluttering characteristics exceeding 30 nm increases the frequency of errors in positioning of the head, which is a reading unit.

Necessary fluttering characteristics differ depending on the type of the applied hard disk drive and can be used to appropriately determine the distribution of intermetallic compound particles. The necessary fluttering characteristics can be obtained by properly adjusting the contents of the added elements, the conditions of casting including a cooling rate during casting (described below), and thermal and processing histories caused by the subsequent steps of heating and processing.

According to an embodiment of the disclosure, the aluminum alloy substrate preferably has a thickness of 0.45 mm or more. An aluminum alloy substrate having a thickness of less than 0.45 mm may be deformed by an accelerating force caused by, for example, falling during installation in the hard disk drive. This limitation can be eliminated if the substrate has a sufficient strength so as not be deformed. An aluminum alloy substrate having a thickness exceeding 1.30 mm can achieve improved fluttering characteristics, but is not preferable because of a smaller number of disks installable in the hard disk drive. Accordingly, the thickness of the aluminum alloy substrate is more preferably in the range of 0.45 to 1.30 mm, and still more preferably in the range of 0.50 to 1.00 mm.

Filling the hard disk drive with helium can reduce the fluid force, because helium has a lower gas viscosity than the air, which is approximately an eighth of the gas viscosity of the air. The reduction in fluid force of gas can decrease the disk flutters caused by gas flows that accompanies the rotation of hard disks.

B. Method of Fabricating the Aluminum Alloy Substrate for a Magnetic Disk

A method of fabricating the aluminum alloy substrate for a magnetic disk according to the disclosure will now be explained in detail regarding the respective steps and processing conditions.

Figure 1:
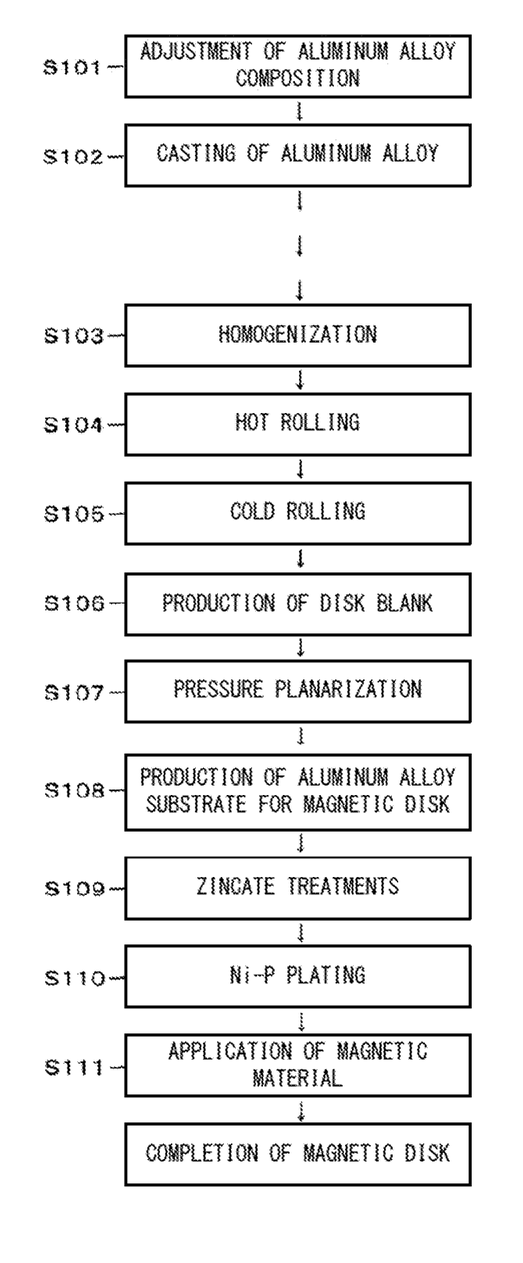
FIG. 1 is a flowchart illustrating a method of fabricating an aluminum alloy substrate for a magnetic disk and the magnetic disk according to the disclosure.

A method of fabricating a magnetic disk composed of an aluminum alloy substrate will be explained in accordance with the flowchart of FIG. 1. In this flowchart, the steps from the adjustment of the aluminum alloy composition (Step S101) to the cold rolling (Step S105) correspond to the steps of fabricating an aluminum alloy plate. The steps from the production of a disk blank (Step S106) to the application of a magnetic material (Step S111) correspond to the steps of converting the fabricated aluminum alloy plate into a magnetic disk.

First, the steps of fabricating an aluminum alloy plate will be explained. An aluminum alloy having the above-described composition is heated and melted into a molten aluminum alloy by a general method (Step S101). This molten aluminum alloy is then cast to prepare an aluminum alloy ingot by, for example, a semi-continuous casting (DC casting) method or a continuous casting (CC) method (Step S102). The following explanation focuses on the DC casting method and the CC method.

In the DC casting method, a molten metal is cast through a spout and is cooled by a bottom block, the wall of a water-cooled mold, and cooling water directly ejected to the circumference of an ingot. The metal is solidified and then extracted downward in the form of an ingot.

In the CC method, a molten metal is supplied between a pair of rollers (alternatively, belt casters or block casters) through a casting nozzle, and is cooled by the rollers, to directly cast a thin plate.

The primary difference between the DC casting method and the CC method is their cooling rates during casting. The CC method having a higher cooling rate provides second phase particles smaller than those in the DC casting method.

The cast aluminum alloy ingot may be subject to homogenization heating, as required (Step S103). If the homogenization heating is conducted, the ingot is heated at a temperature of 280° C. to 620° C. for a period of 0.5 to 60 hours, and preferably at a temperature of 280° C. to 620° C. for a period of 1.0 to 50 hours. If the heating temperature is less than 280° C. or if the heating period is less than 0.5 hours in the homogenization heating, aluminum alloy substrates are not sufficiently homogenized and may have large variations in plating characteristics and fluttering characteristics. At a heating temperature exceeding 620° C. in the homogenization heating, an aluminum alloy ingot may be melted. The effects are saturated and not significantly enhanced even if the heating period in the homogenization heating exceeds 60 hours.

The homogenized aluminum alloy ingot may then be hot rolled to produce a plate, as required (Step S104). Although the conditions of the hot rolling are not particularly limited, the temperature at the start of hot rolling is preferably in the range of 250° C. to 600° C. and the temperature at the end of hot rolling is preferably in the range of 230° C. to 450° C.

The ingot or hot rolled plate is then cold rolled to produce an aluminum alloy plate having a thickness of approximately 1.3 to 0.45 mm (Step S105). The cold rolling is conducted in the temperature range of 60° C. to 180° C. such that a reduction ratio in each path is 15% or more and a total reduction ratio is 50% or more. This process crushes coarse Al—Fe intermetallic compound particles that have originally existed into finer particles, thereby eventually achieving a metal structure, in which a ratio AB is 0.70 or more, where A indicates a distribution density of Al—Fe intermetallic compound particles having maximum diameters of 10 μm or more and less than 16 and B indicates a distribution density of Al—Fe intermetallic compound particles having maximum diameters of 10 μm or more, and a distribution density of Al—Fe intermetallic compound particles having maximum diameters of 40 μm or more is at most one per square millimeter. This structure can improve the smoothness of the plated surface.

In the case of a reduction ratio in each path of less than 15% in the temperature range of 60° C. to 180° C., only the coarse Al—Fe intermetallic compound particles existing on the surface are crushed while the coarse Al—Fe intermetallic compound particles existing inside the substrate are not sufficiently crushed into finer particles, resulting in impairment of the smoothness of the plated surface. In the case of a total reduction ratio of less than 50%, the coarse Al—Fe intermetallic compound particles are not sufficiently crushed into finer particles, resulting in impairment of the smoothness of the plated surface.

At a temperature during the cold rolling of less than 60° C., large cracks occur during the cold rolling because of a large deformation resistance of the materials, making the substrate unacceptable as an aluminum alloy substrate for a magnetic disk. In contrast, at a temperature during the cold rolling exceeding 180° C., the coarse Al—Fe intermetallic compound particles are not sufficiently crushed into finer particles, resulting in impairment of the smoothness of the plated surface.

As described above, the cold rolling is conducted in the temperature range of 60° C. to 180° C. such that a reduction ratio in each path is 15% or more and a total reduction ratio is 50% or more. The temperature range during the cold rolling is preferably 70° C. to 170° C. The reduction ratio in each path is preferably 20% or more, and more preferably 25% or more. The upper limit of reduction ratio in each path is not particularly limited, but is consequentially determined, for example, depending on the rolling properties of the materials. According to the disclosure, the upper limit is approximately 70%. The total reduction ratio is preferably 60% or more, and more preferably 70% or more. The upper limit of total reduction ratio is also not particularly limited, but is consequentially determined, for example, depending on the rolling properties of the materials. According to the disclosure, the upper limit is approximately 95%. The number of paths in the cold rolling is at least one, preferably two or more, and more preferably two.

The aluminum alloy plate may be annealed before or during the cold rolling to secure cold rolling processability. If the annealing is conducted, for example, the plate is preferably heated in a batch manner at a temperature of 300° C. to 500° C. for a period of 0.1 to 30 hours, or in a continuous manner at a temperature of 400° C. to 600° C. for a retention time of 0 to 60 seconds. The retention time of 0 seconds indicates stopping heat retention and cooling the plate immediately after reaching a desired heating temperature.

Next, the steps of converting the aluminum alloy plate fabricated as explained above into a magnetic disk will be explained. In order to prepare the aluminum alloy plate for application to a magnetic disk, the aluminum alloy plate is punched to prepare a disk blank having an annular shape (Step S106). This disk blank is then subject to pressure annealing in the air, for example, at a temperature of 100° C. to 480° C. for a period of 30 minutes or more, to produce a flattened disk blank (Step S107). The disk blank is then subject to a cutting process, a grinding process, and a stress relieving heat treatment, preferably at a temperature of 250° C. to 400° C. for a period of 5 to 15 minutes, in the order mentioned, to produce an aluminum alloy substrate (Step S108). Then, the surface of the aluminum alloy substrate is subject to a degreasing process, an acid etching process, and a desmutting treatment, and then receives zincate treatments (Zn substitution) (Step S109).

The degreasing is conducted using a commercially available degreasing solution, such as AD-68F (manufactured by C. Uyemura & Co., Ltd.), preferably at a temperature of 40° C. to 70° C. for a treatment period of three to ten minutes at a concentration of 200 to 800 mL/L. The acid etching is performed using a commercially available etchant, such as AD-107F (manufactured by C. Uyemura & Co., Ltd.), preferably at a temperature of 50° C. to 75° C. for a treatment period of 0.5 to 5 minutes at a concentration of 20 to 100 mL/L. After the acid etching, if compound removal has already been applied, a typical desmutting treatment is conducted using $HNO_3$, preferably at a temperature of 15° C. to 40° C. for a treatment period of 10 to 120 seconds at a concentration of 10% to 60%. If compound removal has not yet been applied, the compound removal may be performed instead of or in addition to the desmutting treatment.

A first zincate treatment is conducted using a commercially available zincate solution, such as AD-301F-3X (manufactured by C. Uyemura & Co., Ltd.), preferably at a temperature of 10° C. to 35° C. for a treatment period of 0.1 to 5 minutes at a concentration of 100 to 500 mL/L. The first zincate treatment is preferably followed by Zn peeling using $HNO_3$ at a temperature of 15° C. to 40° C. for a treatment period of 10 to 120 seconds at a concentration of 10% to 60%. A second zincate treatment is then conducted under the same conditions as the first zincate treatment.

The surface of the aluminum alloy substrate after the second zincate treatment is provided with electroless Ni—P plating as base plating (Step S110). The electroless Ni—P plating is conducted using a commercially available plating solution, such as NIMUDEN HDX (manufactured by C. Uyemura & Co., Ltd.), preferably at a temperature of 80° C. to 95° C. for a treatment period of 30 to 180 minutes at an Ni concentration of 3 to 10 g/L. This electroless Ni—P plating process can yield a plated aluminum alloy substrate for a magnetic disk provided with base plating.

C. Magnetic Disk

In the last step, the base-plated surface of the plated aluminum alloy substrate for a magnetic disk is smoothed by grinding and is provided with a magnetic medium containing a foundation layer, a magnetic layer, a protective film, and a lubricating layer, by spattering, to thereby complete a magnetic disk (Step S111).

It should be noted that the distribution and composition of the elements do not vary after fabrication of the aluminum alloy plate (Step S105), because the steps after Step S105 do not cause a variation in structure unlike the cold rolling. Accordingly, the distribution, composition, and the like, of the elements may also be evaluated based on the aluminum alloy plate (Step S105), the disk blank (Step S106), the plated aluminum alloy substrate (Step S110), or the magnetic disk (Step S111), instead of the aluminum alloy substrate (Step S108).

EXAMPLES

The disclosure will now be described in more detail based on examples. These examples, however, should not be construed as limiting the disclosure.

Aluminum alloy substrates for magnetic disks according to the examples will be described. Alloy materials containing the constituent elements shown in Tables 1 to 3 were dissolved in accordance with a general procedure to produce molten aluminum alloys (Step S101). Each of the symbols "-" in Tables 1 to 3 indicates a value equal to or less than the measurable threshold.

TABLE 1

| | CONSTITUENT ELEMENTS (mass %) | | | | | | | | | | | | | |
|---|---|---|---|---|---|---|---|---|---|---|---|---|---|---|
| ALLOY No. | Fe | Mn | Si | Ni | Cu | Mg | Cr | Zr | Zn | Ti | B | V | Ti + B + V | Al + UNAVOIDABLE IMPURITIES |
| A1 | 0.4 | — | — | — | 0.020 | — | — | — | 0.230 | — | — | — | 0.000 | Bal. |
| A2 | 0.6 | 0.2 | — | — | 0.020 | — | — | — | 0.230 | — | — | — | 0.000 | Bal. |
| A3 | 0.8 | — | — | — | 0.020 | — | — | — | 0.230 | — | — | — | 0.000 | Bal. |
| A4 | 0.9 | — | — | 0.2 | 0.020 | — | — | — | 0.230 | — | — | — | 0.000 | Bal. |
| A5 | 1.0 | — | — | — | 0.020 | — | — | — | 0.230 | — | — | — | 0.000 | Bal. |
| A6 | 1.2 | — | — | — | 0.020 | — | — | — | 0.230 | — | — | — | 0.000 | Bal. |
| A7 | 1.5 | — | — | — | 0.020 | — | 0.20 | — | 0.230 | — | — | — | 0.000 | Bal. |
| A8 | 1.8 | — | — | — | 0.020 | — | — | 0.20 | 0.230 | — | — | — | 0.000 | Bal. |
| A9 | 2.0 | — | — | — | 0.020 | — | — | — | 0.230 | — | — | — | 0.000 | Bal. |
| A10 | 2.9 | — | — | — | 0.020 | — | — | — | 0.230 | 0.060 | 0.001 | 0.020 | 0.081 | Bal. |
| A11 | 1.5 | 0.1 | — | — | 0.020 | — | — | — | 0.230 | — | — | — | 0.000 | Bal. |
| A12 | 1.5 | 0.3 | — | — | 0.020 | — | — | — | 0.230 | — | — | — | 0.000 | Bal. |
| A13 | 1.5 | 0.6 | — | — | 0.020 | — | — | — | 0.230 | — | — | — | 0.000 | Bal. |
| A14 | 1.5 | 1.5 | — | — | 0.020 | — | — | — | 0.230 | — | — | — | 0.000 | Bal. |
| A15 | 1.5 | 2.9 | — | — | 0.020 | — | — | — | 0.230 | — | — | — | 0.000 | Bal. |
| A16 | 1.5 | — | 0.1 | — | 0.020 | — | — | — | 0.230 | — | — | — | 0.000 | Bal. |
| A17 | 1.5 | — | 0.4 | — | 0.020 | — | — | — | 0.230 | — | — | — | 0.000 | Bal. |
| A18 | 1.5 | — | — | 0.1 | 0.020 | — | — | — | 0.230 | — | — | — | 0.000 | Bal. |
| A19 | 1.5 | — | — | 1.0 | 0.020 | — | — | — | 0.230 | — | — | — | 0.000 | Bal. |
| A20 | 1.5 | — | — | 2.9 | 0.020 | — | — | — | 0.230 | — | — | — | 0.000 | Bal. |
| A21 | 1.5 | — | — | — | 0.005 | — | — | — | 0.230 | — | — | — | 0.000 | Bal. |
| A22 | 1.5 | — | — | — | 0.020 | — | — | — | 0.230 | — | — | — | 0.000 | Bal. |
| A23 | 1.5 | — | — | — | 0.150 | — | — | — | 0.230 | — | — | — | 0.000 | Bal. |
| A24 | 1.5 | — | — | — | 0.950 | — | — | — | 0.230 | — | — | — | 0.000 | Bal. |
| A25 | 1.5 | — | — | — | 0.020 | 0.1 | — | — | 0.230 | — | — | — | 0.000 | Bal. |
| A26 | 1.5 | — | — | — | 0.020 | 0.3 | — | — | 0.230 | — | — | — | 0.000 | Bal. |

TABLE 1-continued

CONSTITUENT ELEMENTS (mass %)

| ALLOY No. | Fe | Mn | Si | Ni | Cu | Mg | Cr | Zr | Zn | Ti | B | V | Ti + B + V | Al + UNAVOIDABLE IMPURITIES |
|---|---|---|---|---|---|---|---|---|---|---|---|---|---|---|
| A27 | 1.5 | — | — | — | 0.020 | 0.4 | — | — | 0.230 | — | — | — | 0.000 | Bal. |
| A28 | 1.5 | — | — | — | 0.020 | — | 0.01 | — | 0.230 | — | — | — | 0.000 | Bal. |
| A29 | 1.5 | — | — | — | 0.020 | — | 0.15 | — | 0.230 | — | — | — | 0.000 | Bal. |
| A30 | 1.5 | — | — | — | 0.020 | — | 0.95 | — | 0.230 | — | — | — | 0.000 | Bal. |

TABLE 2

CONSTITUENT ELEMENTS (mass %)

| ALLOY No. | Fe | Mn | Si | Ni | Cu | Mg | Cr | Zr | Zn | Ti | B | V | Ti + B + V | Al + UNAVOIDABLE IMPURITIES |
|---|---|---|---|---|---|---|---|---|---|---|---|---|---|---|
| A31 | 1.5 | — | — | — | 0.020 | — | — | 0.01 | 0.230 | — | — | — | 0.000 | Bal. |
| A32 | 1.8 | — | — | — | 0.020 | — | — | 0.15 | 0.230 | — | — | — | 0.000 | Bal. |
| A33 | 1.8 | — | — | — | 0.020 | — | — | 0.95 | 0.230 | — | — | — | 0.000 | Bal. |
| A34 | 1.8 | — | — | — | 0.020 | — | — | — | 0.005 | — | — | — | 0.000 | Bal. |
| A35 | 1.5 | — | — | — | 0.020 | — | — | — | 0.350 | — | — | — | 0.000 | Bal. |
| A36 | 1.5 | — | — | — | 0.020 | — | — | — | 0.950 | — | — | — | 0.000 | Bal. |
| A37 | 0.8 | 0.3 | 0.3 | 0.1 | 0.020 | 0.3 | 0.15 | 0.15 | 0.350 | 0.005 | 0.001 | 0.001 | 0.007 | Bal. |
| A38 | 1.5 | 0.3 | 0.3 | 0.1 | 0.020 | 0.3 | 0.15 | 0.15 | 0.350 | 0.070 | 0.001 | 0.021 | 0.092 | Bal. |
| A39 | 2.3 | 0.3 | 0.3 | 0.1 | 0.020 | 0.3 | 0.15 | 0.15 | 0.350 | 0.454 | 0.023 | 0.012 | 0.489 | Bal. |
| A40 | 0.8 | — | — | — | 0.020 | — | — | — | 0.230 | — | — | — | 0.000 | Bal. |
| A41 | 1.2 | — | — | — | 0.020 | — | — | — | 0.230 | — | — | — | 0.000 | Bal. |
| A42 | 2.9 | — | — | — | 0.020 | — | — | — | 0.230 | — | — | — | 0.000 | Bal. |
| A43 | 1.5 | — | — | — | 0.020 | — | — | 0.01 | 0.230 | 0.010 | — | — | 0.010 | Bal. |
| A44 | 1.5 | — | — | — | 0.020 | — | — | 0.01 | 0.230 | 0.390 | — | — | 0.390 | Bal. |
| A45 | 1.5 | — | — | — | 0.020 | — | — | 0.01 | 0.230 | — | — | 0.010 | 0.010 | Bal. |
| A46 | 1.5 | — | — | — | 0.020 | — | — | 0.01 | 0.230 | — | — | 0.351 | 0.351 | Bal. |
| A47 | 1.5 | — | — | — | 0.020 | — | — | 0.01 | 0.230 | 0.050 | — | 0.050 | 0.100 | Bal. |
| A48 | 1.5 | — | — | — | 0.020 | — | — | 0.01 | 0.230 | 0.231 | — | 0.210 | 0.441 | Bal. |

TABLE 3

CONSTITUENT ELEMENTS (mass %)

| ALLOY No. | Fe | Mn | Si | Ni | Cu | Mg | Cr | Zr | Zn | Ti | B | V | Ti + B + V | Al + UNAVOIDABLE IMPURITIES |
|---|---|---|---|---|---|---|---|---|---|---|---|---|---|---|
| AC1 | 0.2 | — | — | — | 0.020 | — | — | — | 0.230 | — | — | — | 0.000 | Bal. |
| AC2 | 0.2 | — | — | — | 0.020 | — | — | — | 0.230 | — | — | — | 0.000 | Bal. |
| AC3 | 0.3 | — | — | — | 0.020 | — | — | — | 0.230 | — | — | — | 0.000 | Bal. |
| AC4 | 3.5 | — | — | — | 0.020 | — | — | — | 0.230 | — | — | — | 0.000 | Bal. |
| AC5 | 4.0 | — | — | — | 0.020 | — | — | — | 0.230 | — | — | — | 0.000 | Bal. |
| AC6 | 0.8 | 3.5 | — | — | 0.020 | — | — | — | 0.230 | — | — | — | 0.000 | Bal. |
| AC7 | 0.8 | — | 0.6 | — | 0.020 | — | — | — | 0.230 | — | — | — | 0.000 | Bal. |
| AC8 | 0.8 | — | — | 3.6 | 0.020 | — | — | — | 0.230 | — | — | — | 0.000 | Bal. |
| AC9 | 0.8 | — | — | — | 1.520 | — | — | — | 0.230 | — | — | — | 0.000 | Bal. |
| AC10 | 0.8 | — | — | — | 0.020 | 0.6 | — | — | 0.230 | — | — | — | 0.000 | Bal. |
| AC11 | 0.8 | — | — | — | 0.020 | — | 1.40 | — | 0.230 | — | — | — | 0.000 | Bal. |
| AC12 | 0.8 | — | — | — | 0.020 | — | — | 1.38 | 0.230 | — | — | — | 0.000 | Bal. |
| AC13 | 0.8 | — | — | — | 0.020 | — | — | — | 1.520 | — | — | — | 0.000 | Bal. |
| AC14 | 0.8 | — | — | — | 0.020 | — | — | — | 0.230 | — | — | — | 0.000 | Bal. |
| AC15 | 0.8 | — | — | — | 0.020 | — | — | — | 0.230 | — | — | — | 0.000 | Bal. |
| AC16 | 0.8 | — | — | — | 0.020 | — | — | — | 0.230 | — | — | — | 0.000 | Bal. |
| AC17 | 0.8 | — | — | — | 0.020 | — | — | — | 0.230 | — | — | — | 0.000 | Bal. |
| AC18 | 0.8 | — | — | — | 0.020 | — | — | — | 0.230 | — | — | — | 0.000 | Bal. |
| AC19 | 0.8 | — | — | — | 0.020 | — | — | — | 0.230 | — | — | — | 0.000 | Bal. |
| AC20 | 0.8 | — | — | — | 0.020 | — | — | — | 0.230 | — | — | — | 0.000 | Bal. |
| AC21 | 0.8 | — | — | — | 0.020 | — | — | — | 0.230 | — | — | — | 0.000 | Bal. |
| AC22 | 0.8 | — | — | — | 0.020 | — | — | — | 0.230 | — | — | — | 0.000 | Bal. |
| AC23 | 0.8 | — | — | — | 0.001 | — | — | — | 0.230 | — | — | — | 0.000 | Bal. |
| AC24 | 0.8 | — | — | — | 0.020 | — | — | — | 0.001 | — | — | — | 0.000 | Bal. |

The molten aluminum alloys, other than the alloys No. A40 to A42 and AC1, were then cast by a DC casting method to produce ingots having a thickness of 400 mm. Both surfaces of the ingots were shaved by 15 mm (Step S102). In contrast, the molten aluminum alloys No. A40 to A42 and AC1 were cast by a CC method to produce ingots. The DC ingots after the surface shaving were then subject to homogenization heating at 550° C. for ten hours (Step S103). The homogenized DC ingots were then hot rolled under the conditions of a temperature at the start of hot rolling of 540° C. and a temperature at the end of hot rolling of 200° C., thereby yielding a hot rolled plate (Step S104). The thicknesses of the CC ingots and the thicknesses of the hot rolled plates are shown in Tables 4 to 6 as the thicknesses before cold rolling.

TABLE 4

| | | COLD ROLLING CONDITIONS | | | | | |
|---|---|---|---|---|---|---|---|
| | ALLOY No. | THICKNESS BEFORE COLD ROLLING (mm) | TEMPERATURE IN FIRST PATH (° C.) | REDUCTION RATIO IN FIRST PATH (%) | TEMPERATURE IN SECOND PATH (° C.) | REDUCTION RATIO IN SECOND PATH (%) | TOTAL REDUCTION RATIO IN TEMPERATURE RANGE OF 60° C. TO 180° C. (%) |
| EXAMPLE 1 | A1 | 7.0 | 63 | 64 | 67 | 68 | 89 |
| EXAMPLE 2 | A2 | 6.0 | 170 | 67 | 178 | 60 | 87 |
| EXAMPLE 3 | A3 | 5.0 | 75 | 60 | 81 | 60 | 84 |
| EXAMPLE 4 | A4 | 4.0 | 159 | 50 | 163 | 60 | 80 |
| EXAMPLE 5 | A5 | 3.0 | 145 | 67 | 148 | 20 | 73 |
| EXAMPLE 6 | A6 | 2.0 | 139 | 25 | 147 | 47 | 60 |
| EXAMPLE 7 | A7 | 1.8 | 146 | 44 | 152 | 20 | 56 |
| EXAMPLE 8 | A8 | 3.0 | 125 | 17 | 131 | 68 | 73 |
| EXAMPLE 9 | A9 | 3.0 | 107 | 33 | 116 | 60 | 73 |
| EXAMPLE 10 | A10 | 3.0 | 137 | 33 | 143 | 60 | 73 |
| EXAMPLE 11 | A11 | 3.0 | 98 | 33 | 105 | 60 | 73 |
| EXAMPLE 12 | A12 | 3.0 | 134 | 33 | 137 | 60 | 73 |
| EXAMPLE 13 | A13 | 3.0 | 90 | 33 | 97 | 60 | 73 |
| EXAMPLE 14 | A14 | 3.0 | 96 | 33 | 99 | 60 | 73 |
| EXAMPLE 15 | A15 | 3.0 | 110 | 33 | 116 | 60 | 73 |
| EXAMPLE 16 | A16 | 3.0 | 115 | 33 | 119 | 60 | 73 |
| EXAMPLE 17 | A17 | 3.0 | 143 | 33 | 150 | 60 | 73 |
| EXAMPLE 18 | A18 | 3.0 | 101 | 33 | 104 | 60 | 73 |
| EXAMPLE 19 | A19 | 3.0 | 138 | 33 | 147 | 60 | 73 |
| EXAMPLE 20 | A20 | 3.0 | 136 | 33 | 144 | 60 | 73 |
| EXAMPLE 21 | A21 | 3.0 | 92 | 33 | 97 | 60 | 73 |
| EXAMPLE 22 | A22 | 3.0 | 104 | 33 | 109 | 60 | 73 |
| EXAMPLE 23 | A23 | 3.0 | 146 | 33 | 152 | 60 | 73 |
| EXAMPLE 24 | A24 | 3.0 | 88 | 33 | 91 | 60 | 73 |
| EXAMPLE 25 | A25 | 3.0 | 130 | 33 | 135 | 60 | 73 |
| EXAMPLE 26 | A26 | 3.0 | 84 | 33 | 90 | 60 | 73 |
| EXAMPLE 27 | A27 | 3.0 | 132 | 33 | 140 | 60 | 73 |
| EXAMPLE 28 | A28 | 3.0 | 142 | 33 | 150 | 60 | 73 |
| EXAMPLE 29 | A29 | 3.0 | 126 | 33 | 133 | 60 | 73 |
| EXAMPLE 30 | A30 | 3.0 | 93 | 33 | 102 | 60 | 73 |

TABLE 5

| | | COLD ROLLING CONDITIONS | | | | | |
|---|---|---|---|---|---|---|---|
| | ALLOY No. | THICKNESS BEFORE COLD ROLLING (mm) | TEMPERATURE IN FIRST PATH (° C.) | REDUCTION RATIO IN FIRST PATH (%) | TEMPERATURE IN SECOND PATH (° C.) | REDUCTION RATIO IN SECOND PATH (%) | TOTAL REDUCTION RATIO IN TEMPERATURE RANGE OF 60° C. TO 180° C. (%) |
| EXAMPLE 31 | A31 | 3.0 | 134 | 33 | 138 | 60 | 73 |
| EXAMPLE 32 | A32 | 3.0 | 141 | 33 | 146 | 60 | 73 |
| EXAMPLE 33 | A33 | 3.0 | 125 | 33 | 128 | 60 | 73 |
| EXAMPLE 34 | A34 | 3.0 | 118 | 33 | 126 | 60 | 73 |
| EXAMPLE 35 | A35 | 3.0 | 95 | 33 | 102 | 60 | 73 |
| EXAMPLE 36 | A36 | 3.0 | 148 | 33 | 155 | 60 | 73 |
| EXAMPLE 37 | A37 | 3.0 | 116 | 33 | 120 | 60 | 73 |
| EXAMPLE 38 | A38 | 3.0 | 100 | 33 | 105 | 60 | 73 |
| EXAMPLE 39 | A39 | 3.0 | 120 | 33 | 128 | 60 | 73 |
| EXAMPLE 40 | A40 | 9.0 | 120 | 69 | 124 | 71 | 91 |

TABLE 5-continued

| | ALLOY No. | THICKNESS BEFORE COLD ROLLING (mm) | COLD ROLLING CONDITIONS | | | | |
|---|---|---|---|---|---|---|---|
| | | | TEMPERATURE IN FIRST PATH (° C.) | REDUCTION RATIO IN FIRST PATH (%) | TEMPERATURE IN SECOND PATH (° C.) | REDUCTION RATIO IN SECOND PATH (%) | TOTAL REDUCTION RATIO IN TEMPERATURE RANGE OF 60° C. TO 180° C. (%) |
| EXAMPLE 41 | A41 | 4.0 | 138 | 50 | 142 | 60 | 80 |
| EXAMPLE 42 | A42 | 2.0 | 110 | 50 | 118 | 20 | 60 |
| EXAMPLE 43 | A43 | 3.0 | 119 | 33 | 123 | 60 | 73 |
| EXAMPLE 44 | A44 | 3.0 | 137 | 33 | 146 | 60 | 73 |
| EXAMPLE 45 | A45 | 3.0 | 148 | 33 | 155 | 60 | 73 |
| EXAMPLE 46 | A46 | 3.0 | 143 | 33 | 152 | 60 | 73 |
| EXAMPLE 47 | A47 | 3.0 | 110 | 33 | 112 | 60 | 73 |
| EXAMPLE 48 | A48 | 3.0 | 88 | 33 | 94 | 60 | 73 |

TABLE 6

| | ALLOY No. | THICKNESS BEFORE COLD ROLLING (mm) | COLD ROLLING CONDITIONS | | | | |
|---|---|---|---|---|---|---|---|
| | | | TEMPERATURE IN FIRST PATH (° C.) | REDUCTION RATIO IN FIRST PATH (%) | TEMPERATURE IN SECOND PATH (° C.) | REDUCTION RATIO IN SECOND PATH (%) | TOTAL REDUCTION RATO IN TEMPERATURE RANGE OF 60° C. TO 180° C. (%) |
| COMPARATIVE EXAMPLE 1 | AC1 | 3.0 | 134 | 33 | 138 | 60 | 73 |
| COMPARATIVE EXAMPLE 2 | AC2 | 3.0 | 141 | 33 | 146 | 60 | 73 |
| COMPARATIVE EXAMPLE 3 | AC3 | 3.0 | 125 | 33 | 128 | 60 | 73 |
| COMPARATIVE EXAMPLE 4 | AC4 | 3.0 | 118 | 33 | 126 | 60 | 73 |
| COMPARATIVE EXAMPLE 5 | AC5 | 3.0 | 95 | 33 | 102 | 60 | 73 |
| COMPARATIVE EXAMPLE 6 | AC6 | 3.0 | 148 | 33 | 155 | 60 | 73 |
| COMPARATIVE EXAMPLE 7 | AC7 | 3.0 | 116 | 33 | 120 | 60 | 73 |
| COMPARATIVE EXAMPLE 8 | AC8 | 3.0 | 100 | 33 | 105 | 60 | 73 |
| COMPARATIVE EXAMPLE 9 | AC9 | 3.0 | 120 | 33 | 128 | 60 | 73 |
| COMPARATIVE EXAMPLE 10 | AC10 | 3.0 | 120 | 33 | 124 | 60 | 73 |
| COMPARATIVE EXAMPLE 11 | AC11 | 3.0 | 138 | 33 | 142 | 60 | 73 |
| COMPARATIVE EXAMPLE 12 | AC12 | 3.0 | 110 | 33 | 118 | 60 | 73 |
| COMPARATIVE EXAMPLE 13 | AC13 | 3.0 | 119 | 33 | 123 | 60 | 73 |
| COMPARATIVE EXAMPLE 14 | AC14 | 3.0 | 45 | 33 | 50 | 60 | 73 |
| COMPARATIVE EXAMPLE 15 | AC15 | 3.0 | 40 | 33 | 46 | 60 | 73 |
| COMPARATIVE EXAMPLE 16 | AC16 | 3.0 | 189 | 33 | 195 | 60 | 73 |
| COMPARATIVE EXAMPLE 17 | AC17 | 3.0 | 192 | 33 | 198 | 60 | 73 |
| COMPARATIVE EXAMPLE 18 | AC18 | 2.0 | 156 | 10 | 164 | 56 | 60 |
| COMPARATIVE EXAMPLE 19 | AC19 | 1.8 | 91 | 50 | 96 | 11 | 56 |
| COMPARATIVE EXAMPLE 20 | AC20 | 1.0 | 125 | 10 | 131 | 11 | 20 |
| COMPARATIVE EXAMPLE 21 | AC21 | 1.4 | 110 | 21 | 118 | 27 | 43 |
| COMPARATIVE EXAMPLE 22 | AC22 | 1.3 | 94 | 23 | 102 | 20 | 38 |

TABLE 6-continued

| | | | COLD ROLLING CONDITIONS | | | | |
|---|---|---|---|---|---|---|---|
| | ALLOY No. | THICKNESS BEFORE COLD ROLLING (mm) | TEMPERATURE IN FIRST PATH (° C.) | REDUCTION RATIO IN FIRST PATH (%) | TEMPERATURE IN SECOND PATH (° C.) | REDUCTION RATIO IN SECOND PATH (%) | TOTAL REDUCTION RATO IN TEMPERATURE RANGE OF 60° C. TO 180° C. (%) |
| COMPARATIVE EXAMPLE 23 | AC23 | 3.0 | 135 | 33 | 135 | 60 | 73 |
| COMPARATIVE EXAMPLE 24 | AC24 | 3.0 | 140 | 33 | 145 | 60 | 73 |

The hot rolled plates of No. A1 and A3 after hot rolling and the ingot of No. A40 were annealed in a batch manner at 360° C. for two hours. The resulting plates or ingot were cold rolled to produce aluminum alloy plates having a target thickness of 0.8 mm (Step S105). The respective conditions of cold rolling are shown in Tables 4 to 6. These aluminum alloy plates were punched to produce annular disk blanks having an outer diameter of 96 mm and an inner diameter of 24 mm (Step S106).

The resulting disk blanks were subject to pressure planarization under a pressure of 0.5 MPa at 250° C. for three hours (Step S107). The disk blanks after pressure planarization were then subject to end face processing to have an outer diameter of 95 mm and an inner diameter of 25 mm, followed by the grinding of the surface by 70 µm. This process yielded aluminum alloy substrates (Step S108). The substrates were then degreased at 60° C. for five minutes using the degreasing solution AD-68F (commercial name, manufactured by C. Uyemura & Co., Ltd.), were subject to acid etching at 65° C. for one minute using the etchant AD-107F (commercial name, manufactured by C. Uyemura & Co., Ltd.), and were desmutted for 20 seconds using a 30% $HNO_3$ aqueous solution (at a room temperature) (Step S109).

After these surface treatments, the disk blanks received zincate treatments on their surfaces by being immersed in the zincate solution AD-301F-3X (commercial name, manufactured by C. Uyemura & Co., Ltd.) at 20° C. for 0.5 minutes (Step S109). The zincate treatments were conducted two times in total and accompanied by a surface peeling process between the zincate treatments, in which the disk blanks were immersed in a 30% $HNO_3$ aqueous solution at a room temperature for 20 seconds. The surfaces after the zincate treatments were then provided with Ni—P having a thickness of 13.5 µm by electroless plating using the electroless Ni—P plating solution NIMUDEN HDX (commercial name, manufactured by C. Uyemura & Co., Ltd.), followed by polish finishing (at an amount of 3.1 µm) with a fabric. This process yielded plated aluminum alloy substrates for magnetic disks (Step S110).

The ground aluminum alloy substrates (Step S108) and the plated and polished aluminum alloy substrates (Step S110) were applied to evaluation described below. Unfortunately, in Comparative Examples 14 and 15, the substrates had a large number of cracks on the surfaces after the cold rolling and were therefore not subject to the evaluation. Five sample disks were processed until the plating in each example. Unfortunately, the plated layers were peeled from all the five disks in Comparative Examples 4 to 13, so that measurement of the level of disk flutters was unavailable in these comparative examples. The peeling of the plated layers occurred in three of the five disks in Examples 10 and 42, two of the five disks in Example 15, and three of the five disks in Example 20. In these examples, the substrates in which no peeling had occurred were evaluated.

[Distribution Density of Al—Fe Intermetallic Compound Particles]

The surface of each of the ground aluminum alloy substrates (Step S108) was observed with an optical microscope at a magnification of 400×. Each field had an area of 1 $mm^2$. The maximum diameters and distribution densities (numbers per square millimeter) of intermetallic compound particles were then measured using the particle analysis software "A-Zou Kun" (commercial name, manufactured by Asahi Kasei Engineering Corporation). This measurement revealed the distribution density A of Al—Fe intermetallic compound particles having maximum diameters of 10 µm or more and less than 16 µm, the distribution density B of Al—Fe intermetallic compound particles having maximum diameters of 10 µm or more, the ratio AB therebetween, and the distribution density of Al—Fe intermetallic compound particles having maximum diameters of 40 µm or more.

[Measurement of the Level of Disk Flutters]

The level of disk flutters was measured using the plated and polished aluminum alloy substrates (Step S110). This measurement was conducted such that the plated aluminum alloy substrates were installed in the commercially available hard disk drive ST2000 (commercial name, manufactured by Seagate Technology LLC) in the presence of air. The motor was directly coupled to and driven by the driver SLD102 (commercial name, manufactured by Tekunoaraibu kabushikigaisha). The rotational speed was set to 7,200 rpm. A plurality of disks was installed all the time, and the upper one of the disks was provided with the laser Doppler vibrometer LDV1800 (commercial name, manufactured by Ono Sokki Co., Ltd.) on the surface of the disk to observe vibration of the surface. The observed vibration was subject to spectrum analysis using the FFT analyzer DS3200 (commercial name, manufactured by Ono Sokki Co., Ltd.). The surface of the disk was observed through an opening preliminarily formed in the cover of the hard disk drive. The squeeze plate of the commercially available hard disk drive was preliminarily removed for evaluation.

The level of fluttering characteristics was evaluated based on the maximum displacement (level of disk flutters (nm)) of a broad peak in the vicinity of 300 to 1,500 Hz in which flutters emerge. This broad peak is called non-repeatable run out (NRRO) and has been found to significantly affect the occurrence of errors in positioning of the head. The level of fluttering characteristics of 30 nm or less in the air was evaluated as A (excellent), the level of more than 30 nm and 40 nm or less as B (good), the level of more than 40 nm and 50 nm or less as C (fair), and the level of more than 50 nm as D (poor).

[Smoothness of an Aluminum Alloy Substrate for a Magnetic Disk after Base Plating]

The number of pits was then counted on the surface of each of the plated and polished aluminum alloy substrates (Step S110) with a SEM at a magnification of 2,000×. Each field had an area of 1 mm². Then, the number of pits having maximum diameters of 1.0 μm or more and less than 5.0 μm was counted, thereby obtaining the number of pits per unit area (density: number per square millimeter).

The maximum diameter of a pit is determined, in a flat image of a pit observed with the SEM, by measuring the maximum distance between one point on the outline of the image and another point on the outline, and measuring such maximum distances for all the points on the outline, and then selecting the largest one of the maximum distances. Although the lower limit of maximum diameters of pits is not particularly limited, no pit having a maximum diameter of less than 1.0 μm was found and therefore excluded from analysis. Not only a pit entirely encompassed in the 1-mm² field but also a pit partly disposed in the field was counted as one pit. The evaluation criteria were as follows: a density of pits of zero per square millimeter was evaluated as A (excellent), one to seven per square millimeter as B (good), and eight or more per square millimeter as D (poor).

The results of the above evaluation are shown in Tables 7 to 9.

TABLE 7

| | ALLOY No. | FLUTTERING CHARACTERISTICS | DISTRIBUTION DENSITY (A) OF Al—Fe INTERMETALLIC COMPOUND PARTICLES HAVING MAXIMUM DIAMETERS OF 10 μm OR MORE AND LESS THAN 16 μm (NUMBER/mm²) | DISTRIBUTION DENSITY (B) OF Al—Fe INTERMETALLIC COMPOUND PARTICLES HAVING MAXIMUM DIAMETERS OF 10 μm OR MORE (NUMBER/mm²) |
|---|---|---|---|---|
| EXAMPLE 1 | A1 | C | 25 | 28 |
| EXAMPLE 2 | A2 | B | 106 | 149 |
| EXAMPLE 3 | A3 | A | 185 | 203 |
| EXAMPLE 4 | A4 | A | 310 | 350 |
| EXAMPLE 5 | A5 | A | 332 | 402 |
| EXAMPLE 6 | A6 | A | 396 | 490 |
| EXAMPLE 7 | A7 | A | 508 | 554 |
| EXAMPLE 8 | A8 | A | 594 | 654 |
| EXAMPLE 9 | A9 | A | 650 | 691 |
| EXAMPLE 10 | A10 | A | 1032 | 1042 |
| EXAMPLE 11 | A11 | A | 502 | 584 |
| EXAMPLE 12 | A12 | A | 515 | 593 |
| EXAMPLE 13 | A13 | A | 535 | 642 |
| EXAMPLE 14 | A14 | A | 594 | 674 |
| EXAMPLE 15 | A15 | A | 687 | 831 |
| EXAMPLE 16 | A16 | A | 506 | 652 |
| EXAMPLE 17 | A17 | A | 473 | 565 |
| EXAMPLE 18 | A18 | A | 502 | 593 |
| EXAMPLE 19 | A19 | A | 562 | 643 |
| EXAMPLE 20 | A20 | A | 688 | 812 |
| EXAMPLE 21 | A21 | A | 437 | 567 |
| EXAMPLE 22 | A22 | A | 498 | 593 |
| EXAMPLE 23 | A23 | A | 503 | 593 |
| EXAMPLE 24 | A24 | A | 499 | 602 |
| EXAMPLE 25 | A25 | A | 527 | 543 |
| EXAMPLE 26 | A26 | A | 473 | 563 |
| EXAMPLE 27 | A27 | A | 538 | 648 |
| EXAMPLE 28 | A28 | A | 506 | 638 |
| EXAMPLE 29 | A29 | A | 505 | 631 |
| EXAMPLE 30 | A30 | A | 558 | 629 |

| | A/B | DISTRIBUTION DENSITY OF Al—Fe COMPOUND PARTICLES DISTRIBUTION DENSITY OF Al—Fe INTERMETALLIC COMPOUND PARTICLES HAVING MAXIMUM DIAMETERS OF 40 μm OR MORE (NUMBER/mm²) | SMOOTHNESS OF PLATED SURFACE DISTRIBUTION OF PLATING PITS HAVING MAXIMUM DIAMETERS OF 1.0 μm OR MORE AND LESS THAN 5.0 μm (NUMBER/mm²) | EVALUATION |
|---|---|---|---|---|
| EXAMPLE 1 | 0.89 | 0 | 0 | A |
| EXAMPLE 2 | 0.71 | 0 | 0 | A |
| EXAMPLE 3 | 0.91 | 0 | 0 | A |

TABLE 7-continued

| | | | | | |
|---|---|---|---|---|---|
| EXAMPLE 4 | 0.89 | 0 | | 0 | A |
| EXAMPLE 5 | 0.83 | 0 | | 0 | A |
| EXAMPLE 6 | 0.81 | 0 | | 0 | A |
| EXAMPLE 7 | 0.92 | 0 | | 0 | A |
| EXAMPLE 8 | 0.91 | 0 | | 0 | A |
| EXAMPLE 9 | 0.94 | 0 | | 0 | A |
| EXAMPLE 10 | 0.99 | 1 | | 6 | B |
| EXAMPLE 11 | 0.86 | 0 | | 0 | A |
| EXAMPLE 12 | 0.87 | 0 | | 0 | A |
| EXAMPLE 13 | 0.83 | 0 | | 0 | A |
| EXAMPLE 14 | 0.88 | 0 | | 0 | A |
| EXAMPLE 15 | 0.83 | 1 | | 3 | B |
| EXAMPLE 16 | 0.78 | 0 | | 0 | A |
| EXAMPLE 17 | 0.84 | 0 | | 0 | A |
| EXAMPLE 18 | 0.85 | 0 | | 0 | A |
| EXAMPLE 19 | 0.87 | 0 | | 0 | A |
| EXAMPLE 20 | 0.85 | 1 | | 2 | B |
| EXAMPLE 21 | 0.77 | 0 | | 0 | A |
| EXAMPLE 22 | 0.84 | 0 | | 0 | A |
| EXAMPLE 23 | 0.85 | 0 | | 0 | A |
| EXAMPLE 24 | 0.83 | 0 | | 0 | A |
| EXAMPLE 25 | 0.97 | 0 | | 0 | A |
| EXAMPLE 26 | 0.84 | 0 | | 0 | A |
| EXAMPLE 27 | 0.83 | 0 | | 0 | A |
| EXAMPLE 28 | 0.79 | 0 | | 0 | A |
| EXAMPLE 29 | 0.80 | 0 | | 0 | A |
| EXAMPLE 30 | 0.89 | 0 | | 0 | A |

TABLE 8

| | ALLOY No. | FLUTTERING CHARACTERISTICS | DISTRIBUTION DENSITY OF Al—Fe COMPOUND PARTICLES | |
|---|---|---|---|---|
| | | | DISTRIBUTION DENSITY (A) OF Al—Fe INTERMETALLIC COMPOUND PARTICLES HAVING MAXIMUM DIAMETERS OF 10 μm OR MORE AND LESS THAN 16 μm (NUMBER/mm²) | DISTRIBUTION DENSITY (B) OF Al—Fe INTERMETALLIC COMPOUND PARTICLES HAVING MAXIMUM DIAMETERS OF 10 μm OR MORE (NUMBER/mm²) |
| EXAMPLE 31 | A31 | A | 473 | 543 |
| EXAMPLE 32 | A32 | A | 602 | 693 |
| EXAMPLE 33 | A33 | A | 621 | 793 |
| EXAMPLE 34 | A34 | A | 571 | 654 |
| EXAMPLE 35 | A35 | A | 522 | 693 |
| EXAMPLE 36 | A36 | A | 546 | 591 |
| EXAMPLE 37 | A37 | A | 300 | 354 |
| EXAMPLE 38 | A38 | A | 531 | 604 |
| EXAMPLE 39 | A39 | A | 703 | 767 |
| EXAMPLE 40 | A40 | A | 274 | 320 |
| EXAMPLE 41 | A41 | A | 397 | 531 |
| EXAMPLE 42 | A42 | A | 807 | 875 |
| EXAMPLE 43 | A43 | A | 480 | 543 |
| EXAMPLE 44 | A44 | A | 466 | 503 |
| EXAMPLE 45 | A45 | A | 505 | 593 |
| EXAMPLE 46 | A46 | A | 513 | 607 |
| EXAMPLE 47 | A47 | A | 468 | 512 |
| EXAMPLE 48 | A48 | A | 520 | 582 |

| | DISTRIBUTION DENSITY OF Al—Fe COMPOUND PARTICLES | | SMOOTHNESS OF PLATED SURFACE | |
|---|---|---|---|---|
| | A/B | DISTRIBUTION DENSITY OF Al—Fe INTERMETALLIC COMPOUND PARTICLES HAVING MAXIMUM DIAMETERS OF 40 μm OR MORE (NUMBER/mm²) | DISTRIBUTION OF PLATING PITS HAVING MAXIMUM DIAMETERS OF 1.0 μm OR MORE AND LESS THAN 5.0 μm (NUMBER/mm²) | EVALUATION |
| EXAMPLE 31 | 0.87 | 0 | 0 | A |
| EXAMPLE 32 | 0.87 | 0 | 0 | A |

TABLE 8-continued

| | | | | |
|---|---|---|---|---|
| EXAMPLE 33 | 0.78 | 0 | 0 | A |
| EXAMPLE 34 | 0.87 | 0 | 0 | A |
| EXAMPLE 35 | 0.75 | 0 | 0 | A |
| EXAMPLE 36 | 0.92 | 0 | 0 | A |
| EXAMPLE 37 | 0.85 | 0 | 0 | A |
| EXAMPLE 38 | 0.88 | 0 | 0 | A |
| EXAMPLE 39 | 0.92 | 0 | 0 | A |
| EXAMPLE 40 | 0.86 | 0 | 0 | A |
| EXAMPLE 41 | 0.75 | 0 | 0 | A |
| EXAMPLE 42 | 0.92 | 0 | 0 | A |
| EXAMPLE 43 | 0.88 | 0 | 0 | A |
| EXAMPLE 44 | 0.93 | 0 | 0 | A |
| EXAMPLE 45 | 0.85 | 0 | 0 | A |
| EXAMPLE 46 | 0.84 | 0 | 0 | A |
| EXAMPLE 47 | 0.91 | 0 | 0 | A |
| EXAMPLE 48 | 0.89 | 0 | 0 | A |

TABLE 9

| | | | DISTRIBUTION DENSITY OF Al—Fe COMPOUND PARTICLES | |
|---|---|---|---|---|
| | ALLOY No. | FLUTTERING CHARACTERISTICS | DISTRIBUTION DENSITY (A) OF Al—Fe INTERMETALLIC COMPOUND PARTICLES HAVING MAXIMUM DIAMETERS OF 10 μm OR MORE AND LESS THAN 16 μm (NUMBER/mm$^2$) | DISTRIBUTION DENSITY (B) OF Al—Fe INTERMETALLIC COMPOUND PARTICLES HAVING MAXIMUM DIAMETERS OF 10 μm OR MORE (NUMBER/mm$^2$) |
| COMPARATIVE EXAMPLE 1 | AC1 | D | 12 | 14 |
| COMPARATIVE EXAMPLE 2 | AC2 | D | 13 | 16 |
| COMPARATIVE EXAMPLE 3 | AC3 | D | 20 | 25 |
| COMPARATIVE EXAMPLE 4 | AC4 | — | 1530 | 1,659 |
| COMPARATIVE EXAMPLE 5 | AC5 | — | 2912 | 4,021 |
| COMPARATIVE EXAMPLE 6 | AC6 | — | 783 | 843 |
| COMPARATIVE EXAMPLE 7 | AC7 | — | 268 | 345 |
| COMPARATIVE EXAMPLE 8 | AC8 | — | 1235 | 1,453 |
| COMPARATIVE EXAMPLE 9 | AC9 | — | 274 | 356 |
| COMPARATIVE EXAMPLE 10 | AC10 | — | 292 | 385 |
| COMPARATIVE EXAMPLE 11 | AC11 | — | 831 | 981 |
| COMPARATIVE EXAMPLE 12 | AC12 | — | 543 | 654 |
| COMPARATIVE EXAMPLE 13 | AC13 | — | 277 | 376 |
| COMPARATIVE EXAMPLE 14 | AC14 | — | — | — |
| COMPARATIVE EXAMPLE 15 | AC15 | — | — | — |
| COMPARATIVE EXAMPLE 16 | AC16 | A | 134 | 223 |
| COMPARATIVE EXAMPLE 17 | AC17 | A | 124 | 251 |
| COMPARATIVE EXAMPLE 18 | AC18 | A | 187 | 301 |
| COMPARATIVE EXAMPLE 19 | AC19 | A | 135 | 309 |
| COMPARATIVE EXAMPLE 20 | AC20 | A | 139 | 392 |
| COMPARATIVE EXAMPLE 21 | AC21 | A | 126 | 281 |
| COMPARATIVE EXAMPLE 22 | AC22 | A | 105 | 243 |

TABLE 9-continued

| | | | | |
|---|---|---|---|---|
| COMPARATIVE EXAMPLE 23 | AC23 | A | 136 | 283 |
| COMPARATIVE EXAMPLE 24 | AC24 | A | 111 | 248 |

| | DISTRIBUTION DENSITY OF Al—Fe COMPOUND PARTICLES | | SMOOTHNESS OF PLATED SURFACE | |
|---|---|---|---|---|
| | | DISTRIBUTION DENSITY | | |
| | A/B | OF Al—Fe INTERMETALLIC COMPOUND PARTICLES HAVING MAXIMUM DIAMETERS OF 40 μm OR MORE (NUMBER/mm$^2$) | DISTRIBUTION OF PLATING PITS HAVING MAXIMUM DIAMETERS OF 1.0 μm OR MORE AND LESS THAN 5.0 μm (NUMBER/mm$^2$) | EVALUATION |
| COMPARATIVE EXAMPLE 1 | 0.86 | 0 | 0 | A |
| COMPARATIVE EXAMPLE 2 | 0.81 | 0 | 0 | A |
| COMPARATIVE EXAMPLE 3 | 0.80 | 0 | 0 | A |
| COMPARATIVE EXAMPLE 4 | 0.92 | 10 | 76 | D |
| COMPARATIVE EXAMPLE 5 | 0.72 | 12 | 83 | D |
| COMPARATIVE EXAMPLE 6 | 0.93 | 3 | 32 | D |
| COMPARATIVE EXAMPLE 7 | 0.78 | 0 | 0 | A |
| COMPARATIVE EXAMPLE 8 | 0.85 | 5 | 32 | D |
| COMPARATIVE EXAMPLE 9 | 0.77 | 0 | 21 | D |
| COMPARATIVE EXAMPLE 10 | 0.76 | 0 | 0 | A |
| COMPARATIVE EXAMPLE 11 | 0.85 | 4 | 23 | D |
| COMPARATIVE EXAMPLE 12 | 0.83 | 6 | 49 | D |
| COMPARATIVE EXAMPLE 13 | 0.74 | 0 | 10 | D |
| COMPARATIVE EXAMPLE 14 | — | — | — | — |
| COMPARATIVE EXAMPLE 15 | — | — | — | — |
| COMPARATIVE EXAMPLE 16 | 0.60 | 0 | 12 | D |
| COMPARATIVE EXAMPLE 17 | 0.49 | 0 | 20 | D |
| COMPARATIVE EXAMPLE 18 | 0.62 | 0 | 11 | D |
| COMPARATIVE EXAMPLE 19 | 0.44 | 0 | 21 | D |
| COMPARATIVE EXAMPLE 20 | 0.35 | 0 | 32 | D |
| COMPARATIVE EXAMPLE 21 | 0.45 | 0 | 23 | D |
| COMPARATIVE EXAMPLE 22 | 0.43 | 0 | 21 | D |
| COMPARATIVE EXAMPLE 23 | 0.48 | 0 | 15 | D |
| COMPARATIVE EXAMPLE 24 | 0.45 | 0 | 18 | D |

As shown in Tables 7 and 8, Examples 1 to 48 were able to achieve preferable smoothness of the plated surfaces and preferable fluttering characteristics.

In contrast, in Comparative Examples 1 and 3, the substrates had inferior fluttering characteristics, because of the excessively low Fe contents of the aluminum alloys.

In Comparative Examples 4 and 5, since the plated layers were peeled from the substrates due to the excessively high Fe contents of the aluminum alloys as described above, the substrates failed to be evaluated in terms of fluttering characteristics and were not acceptable as magnetic disks. In addition, the substrates contained a large number of coarse intermetallic compound particles, which caused a large number of pits on the plated surfaces, thereby impairing the smoothness of the plated surfaces.

In Comparative Example 6, since the plated layers were peeled from the substrates due to the excessively high Mn content of the aluminum alloy as described above, the substrates failed to be evaluated in terms of fluttering characteristics and were not acceptable as magnetic disks. In addition, the substrates contained a large number of coarse intermetallic compound particles, which caused a large number of pits on the plated surfaces, thereby impairing the smoothness of the plated surfaces.

In Comparative Example 7, since the plated layers were peeled from the substrates due to the excessively high Si content of the aluminum alloy as described above, the substrates failed to be evaluated in terms of fluttering characteristics and were not acceptable as magnetic disks.

In Comparative Example 8, since the plated layers were peeled from the substrates due to the excessively high Ni content of the aluminum alloy as described above, the substrates failed to be evaluated in terms of fluttering characteristics and were not acceptable as magnetic disks. In addition, the substrates contained a large number of coarse intermetallic compound particles, which caused a large number of pits on the plated surfaces, thereby impairing the smoothness of the plated surfaces.

In Comparative Example 9, since the plated layers were peeled from the substrates due to the excessively high Cu content of the aluminum alloy as described above, the substrates failed to be evaluated in terms of fluttering characteristics and were not acceptable as magnetic disks. Furthermore, the substrates had nonuniform zincate coatings, which caused a large number of pits on the plated surfaces, thereby impairing the smoothness of the plated surfaces.

In Comparative Example 10, since the plated layers were peeled from the substrates due to the excessively high Mg content of the aluminum alloy as described above, the substrates failed to be evaluated in terms of fluttering characteristics and were not acceptable as magnetic disks.

In Comparative Example 11, since the plated layers were peeled from the substrates due to the excessively high Cr content of the aluminum alloy as described above, the substrates failed to be evaluated in terms of fluttering characteristics and were not acceptable as magnetic disks. In addition, the substrates contained a large number of coarse intermetallic compound particles, which caused a large number of pits on the plated surfaces, thereby impairing the smoothness of the plated surfaces.

In Comparative Example 12, since the plated layers were peeled from the substrates due to the excessively high Zr content of the aluminum alloy as described above, the substrates failed to be evaluated in terms of fluttering characteristics and were not acceptable as magnetic disks. In addition, the substrates contained a large number of coarse intermetallic compound particles, which caused a large number of pits on the plated surfaces, thereby impairing the smoothness of the plated surfaces.

In Comparative Example 13, since the plated layers were peeled from the substrates due to the excessively high Zn content of the aluminum alloy as described above, the substrates failed to be evaluated in terms of fluttering characteristics and were not acceptable as magnetic disks. Furthermore, the substrates had nonuniform zincate coatings, which caused a large number of pits on the plated surfaces, thereby impairing the smoothness of the plated surfaces.

In Comparative Examples 14 and 15, the substrates had cracks on their surfaces due to the excessively low temperatures during the cold rolling and therefor failed to be evaluated and were not acceptable as magnetic disks.

In Comparative Examples 16 and 17, the substrates contained a large number of intermetallic compound particles having diameters of 16 μm or more due to the excessively high temperatures during the cold rolling, resulting in ratios A/B of less than 0.70. These intermetallic compound particles caused a large number of pits on the plated surfaces, thereby impairing the smoothness of the plated surfaces.

The substrates contained a large number of intermetallic compound particles having diameters of 16 μm or more, due to the excessively low reduction ratio in the first path during the cold rolling in Comparative Example 18, or due to the excessively low reduction ratio in the second path during the cold rolling in Comparative Example 19, resulting in ratios A/B of less than 0.70. These intermetallic compound particles caused a large number of pits on the plated surfaces, thereby impairing the smoothness of the plated surfaces.

In Comparative Example 20, the substrates contained a large number of intermetallic compound particles having diameters of 16 μm or more due to the excessively low reduction ratios in the first and second paths and the excessively low total reduction ratio during the cold rolling, resulting in a ratio A/B of less than 0.70. These intermetallic compound particles caused a large number of pits on the plated surfaces, thereby impairing the smoothness of the plated surfaces.

In Comparative Examples 21 and 22, the substrates contained a large number of intermetallic compound particles having diameters of 16 μm or more due to the excessively low total reduction ratios during the cold rolling, resulting in ratios A/B of less than 0.70. These intermetallic compound particles caused a large number of pits on the plated surfaces, thereby impairing the smoothness of the plated surfaces.

In Comparative Example 23, due to the excessively low Cu content of the aluminum alloy, the substrates had nonuniform zincate coatings and contained a large number of intermetallic compound particles having diameters of 16 μm or more, resulting in a ratio A/B of less than 0.70. These intermetallic compound particles caused a large number of pits on the plated surfaces, thereby impairing the smoothness of the plated surfaces.

In Comparative Example 24, due to the excessively low Zn content of the aluminum alloy, the substrates had nonuniform zincate coatings and contained a large number of intermetallic compound particles having diameters of 16 μm or more, resulting in a ratio A/B of less than 0.70. These intermetallic compound particles caused a large number of pits on the plated surfaces, thereby impairing the smoothness of the plated surfaces.

INDUSTRIAL APPLICABILITY

The disclosure can provide an aluminum alloy substrate for a magnetic disk having excellent plating characteristics and fluttering characteristics of the disk, a method of fabricating the aluminum alloy substrate for a magnetic disk, and a magnetic disk composed of the aluminum alloy substrate for a magnetic disk.

The invention claimed is:

1. An aluminum alloy substrate for a magnetic disk, the substrate comprising an aluminum alloy comprising 0.4 to 3.0 mass % of Fe, 0.005 to 1.000 mass % of Cu, 0.005 to 1.000 mass % of Zn, and optionally one or more elements selected from a group consisting of 0.1 to 3.0 mass % of Mn, 0.1 to 0.4 mass % of Si, 0.1 to 0.4 mass % of Mg, 0.1 to 3.0 mass % of Ni, 0.1 to 1.00 mass % of Cr, and 0.01 to 1.00 mass % of Zr, with a balance of Al and unavoidable impurities, wherein the substrate has a ratio A/B of 0.70 or more, where A indicates a distribution density of Al—Fe intermetallic compound particles having maximum diameters of 10

μm or more and less than 16 μm, and B indicates a distribution density of Al—Fe intermetallic compound particles having maximum diameters of 10 μm or more, and a distribution density of Al—Fe intermetallic compound particles having maximum diameters of 40 μm or more is at most one per square millimeter.

2. The aluminum alloy substrate for a magnetic disk according to claim 1, wherein the aluminum alloy further comprises one or more elements selected from a group comprising Ti, B, and V at a total content of 0.005 to 0.500 mass %.

3. A magnetic disk comprising:
the aluminum alloy substrate for a magnetic disk according to claim 1;
an electroless Ni—P plated layer on a surface of the aluminum alloy substrate; and
a magnetic material layer on the plated layer.

4. A method of fabricating the aluminum alloy substrate for a magnetic disk according to claim 1, the method comprising:
casting the aluminum alloy to produce an ingot;
heating the produced ingot to homogenize the produced ingot;
hot rolling the homogenized ingot;
cold rolling the hot rolled ingot to produce a plate;
punching the cold rolled plate to produce a disk blank having an annular shape;
pressure annealing the disk blank; and
cutting and grinding the pressure annealed disk blank, wherein
the cold rolling is conducted in a temperature range of 60° C. to 180° C. such that a reduction ratio in each path is 15% or more and a total reduction ratio is 50% or more.

5. The method of fabricating the aluminum alloy substrate for a magnetic disk according to claim 4, wherein:
the produced ingot is heated at a temperature of 280° C. to 620° C. for 0.5 to 60 hours; and
the homogenized ingot is hot rolled at a start temperature of 250° C. to 600° C. and an end temperature of 230° C. to 450° C. to produce a plate.

6. The method of fabricating the aluminum alloy substrate for a magnetic disk according to claim 4, further comprising:
annealing the ingot or the rolled plate before or during the cold rolling, wherein
the annealing is conducted in a batch manner at a temperature of 300° C. to 500° C. for 0.1 to 30 hours, or in a continuous manner at a temperature of 400° C. to 600° C. for 0 to 60 seconds.

7. A magnetic disk comprising:
the aluminum alloy substrate for a magnetic disk according to claim 2;
an electroless Ni—P plated layer on a surface of the aluminum alloy substrate; and
a magnetic material layer on the plated layer.

* * * * *